Patented Nov. 17, 1953

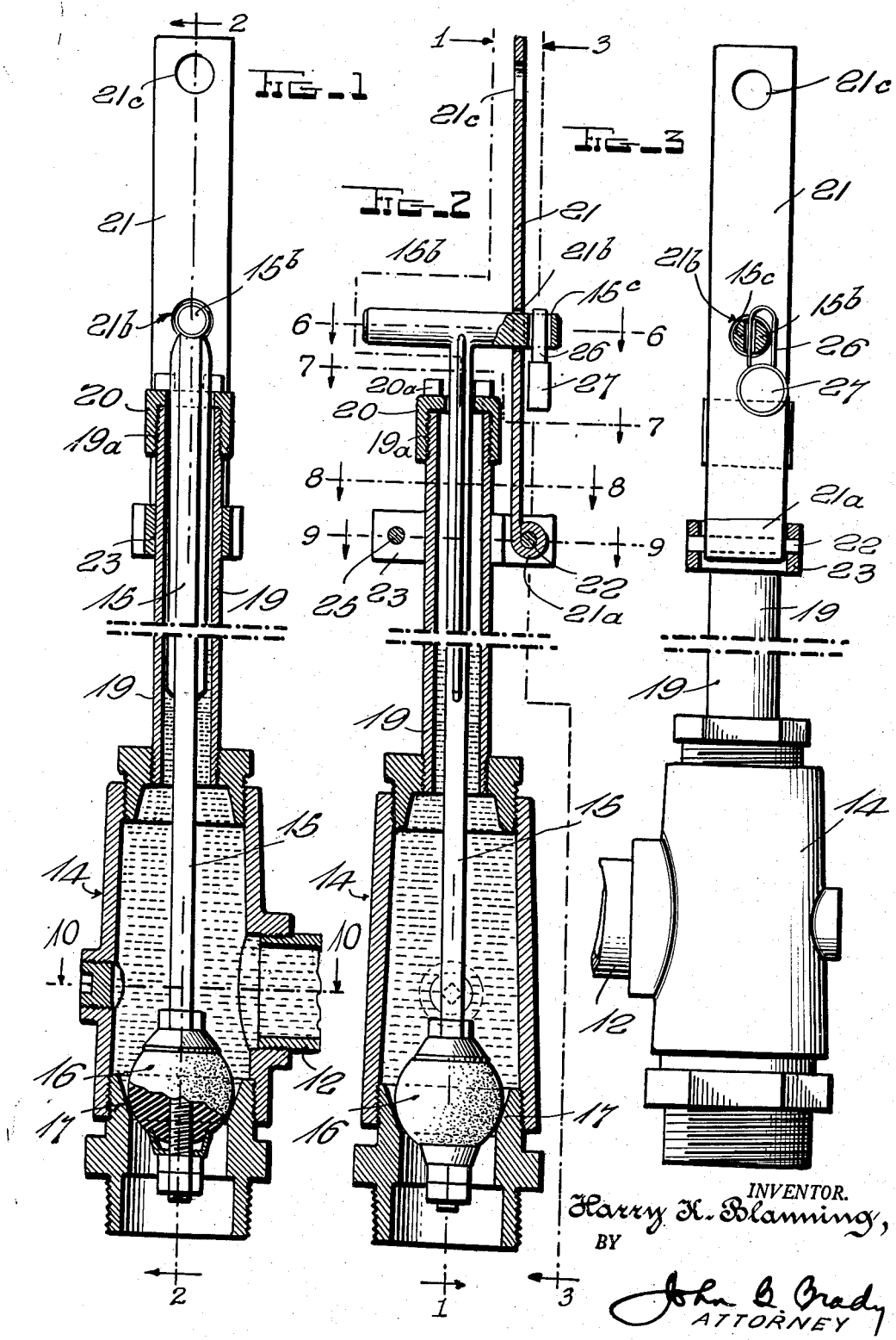

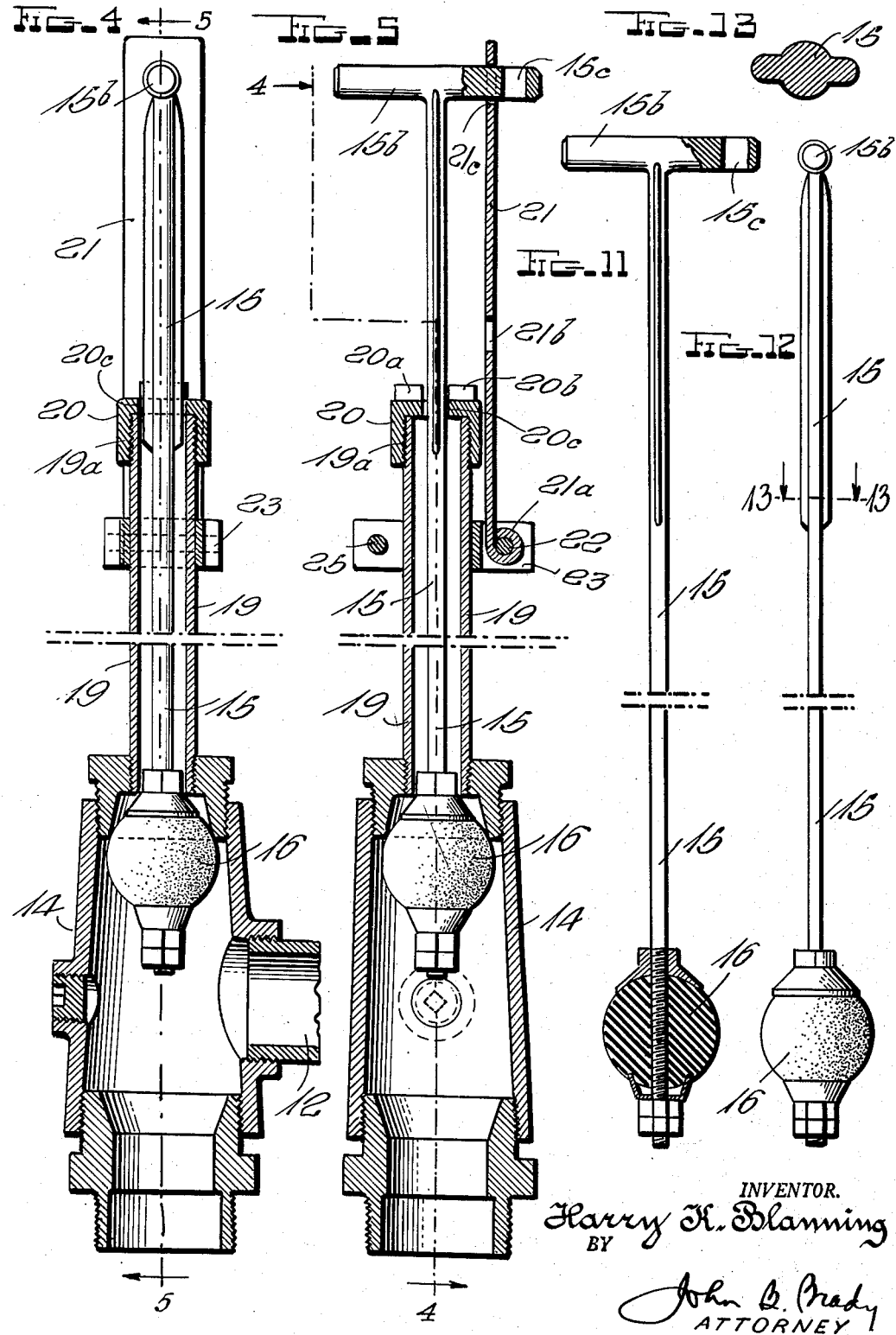

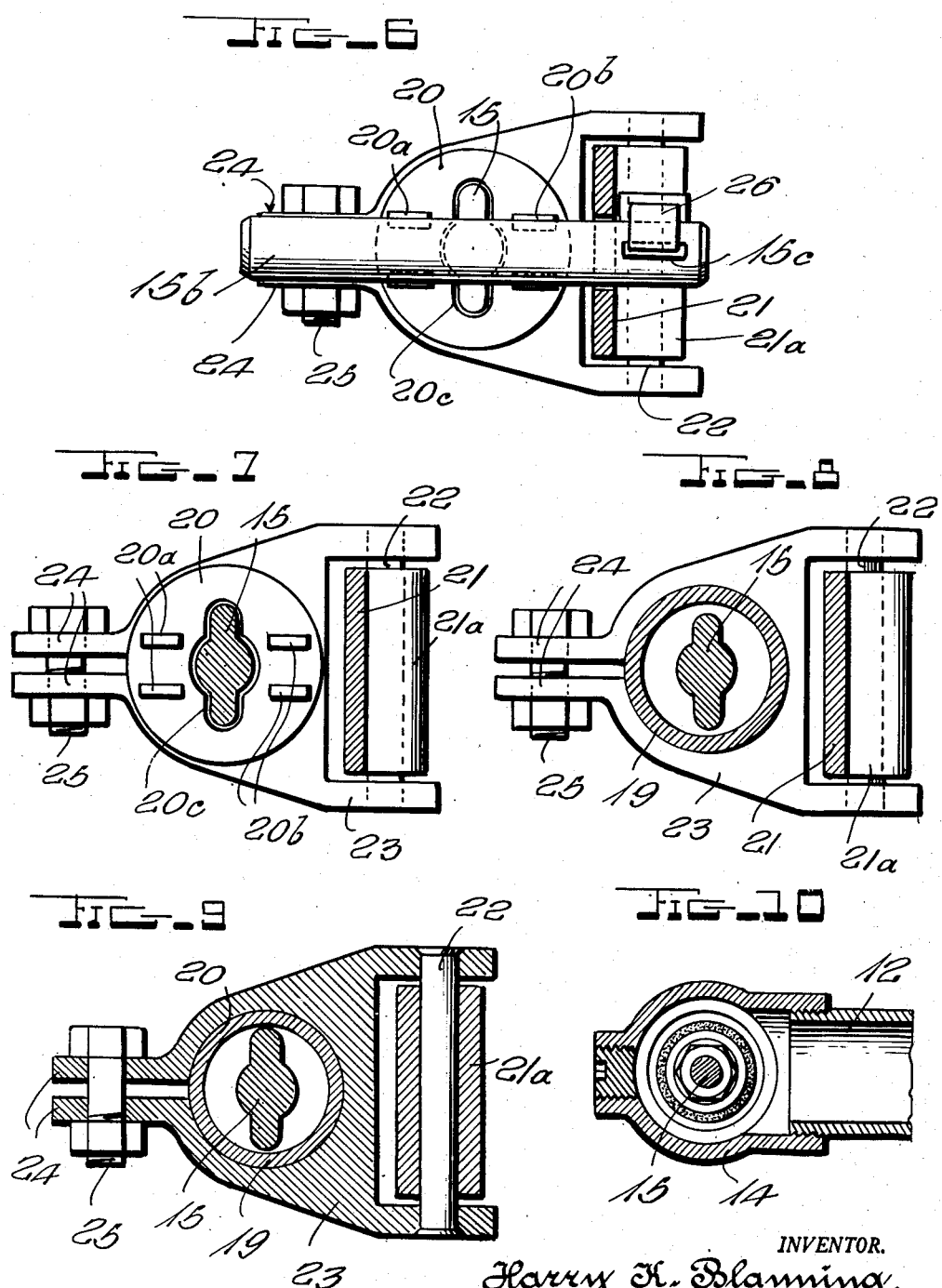

2,659,242

UNITED STATES PATENT OFFICE 2,659,242

SEAL FOR VALVE ACTUATORS

Harry K. Blanning, Chicago, Ill., assignor, by mesne assignments, to International Steel Company, Evansville, Ind., a corporation of Indiana Application December 30, 1948, Serial No. 68,359

1 Claim. (Cl. 74—503)

My invention relates broadly to valves, and more particularly to an arrangement of locking means for locking valves against tampering.

One of the objects of my invention is to provide a system for locking the valve control means for brine tanks in refrigeration cars against unauthorized operation.

Another object of my invention is to provide a construction of valve lock which may be conveniently secured in position adjacent a valve actuator for preventing unauthorized operation of the valve actuator.

Another object of my invention is to provide a simplified construction of locking seal for the brine control valve of a refrigeration car for preventing the release of the valve and the draining of brine while the refrigeration car is en route, thus causing dissipation of the refrigerant with resultant spoilage of the shipment.

Another object of my invention is to provide a simplified attachment which may be readily installed on the valve manipulator of a refrigeration car control valve for locking the manipulator in either of two limiting positions and preventing unauthorized operation thereof.

Other and further objects of my invention reside in a simplified construction of locking bar for valve mechanism for locking the valve mechanism in either open or closed position as set forth more fully in the specification hereinafter following by reference to the accompanying drawings, in which:

Figure 1 is a vertical sectional view of a brine drain valve shown in closed and locked position according to my invention when all of the brine tanks of a refrigerator car are filled with brine, the view being taken substantially on line 1—1 of Fig. 2;

Fig. 2 is a vertical sectional view of the brine drain valve in the position illustrated in Fig. 1, the view being taken on line 2—2 of Fig. 1;

Fig. 3 is a side elevational view of the brine drain valve equipped with the lock of my invention, certain of the parts being shown in vertical position on line 3—3 of Fig. 2;

Fig. 4 is a vertical sectional view through the drain valve illustrating the valve in open position with the brine tank drain, the view being taken substantially on line 4—4 of Fig. 5;

Fig. 5 is a vertical sectional view through the drain valve and lock substantially on line 5—5 of Fig. 4;

Fig. 6 is a horizontal sectional view taken substantially on line 6—6 of Fig. 2;

Fig. 7 is a horizontal sectional view taken substantially on line 7—7 of Fig. 2;

Fig. 8 is a horizontal sectional view taken substantially on line 8—8 of Fig. 2;

Fig. 9 is a horizontal sectional view taken substantially on line 9—9 of Fig. 2;

Fig. 10 is a horizontal sectional view taken substantially on line 10—10 of Fig. 2;

Fig. 11 is a detailed side elevational view of the valve rod illustrating the manually operated handle of the valve partially in longitudinal section;

Fig. 12 is a view of the valve rod looking at the end of the manually operated handle; and Fig. 13 is a transverse sectional view taken on line 13—13 of Fig. 12.

In the operation of refrigeration cars the brine control valve is located in a position adjacent the roof of the car where it must be available for inspection at regular intervals. Considerable loss has been experienced in the spoilage of shipments in refrigeration cars by tampering with the brine control valve which, if moved to open position, results in the loss of protection of the shipment afforded by refrigeration. Unauthorized persons, in tampering with the valve control actuator, have often caused the draining of the brine system while the refrigeration car was en route, resulting in dissipation of the refrigerant with resulting spoilage of the shipment. The locking seal of my invention, when applied to the brine control valve, prevents the unauthorized manipulation of the valve and ensures a permanent condition of the refrigerant from the time of the inspection and release of the shipment to the time of arrival of the shipment. The locking seal of my invention is sealed at the time of release of the refrigeration car and the brine control valve cannot then be tampered with by unauthorized persons.

Referring to the drawings in more detail, reference character 12 designates the refrigerant supply pipe which connects to valve housing 14 through which there extends the valve actuating rod 15 connected with ball valve 16 adapted to seat against the annular valve seat 17. The valve housing 14 connects to a drain line at 18 and to the supply line 12.

The valve operating rod 15 extends vertically through the guide pipe 19 to a position adjacent the roof of a refrigeration car where it terminates. The guide pipe 19 is externally screw-threaded at the upper end thereof represented at 19a and receives the internally screw-threaded latching cap 20, illustrated more clearly in Figs. 8 and 9. The latching cap 20 is provided with pairs of upwardly projecting engaging lugs 20a and 20b which are used for engaging the flutes on the valve handle to maintain the valve in a raised open position. Latching cap 20 is centrally apertured at 20c in substantially cruciform section corresponding in shape with the cruciform section of the upper end 15a of valve actuating rod 15. As illustrated more clearly in Fig. 8, the cruciform structure of valve actuating rod 15 snugly conforms within the cruciform aperture 20c in latching cap 20 and serves to longitudinally align the movement of valve actuating rod 15 within guide pipe 19 in the displacement of the valve control actuating rod to either of two limiting positions. The valve actuating rod 15 terminates in a hand grip 15b extending normal to the axis of the valve actuating rod 15 which may be manually gripped for moving the valve actuating rod to either of two limiting positions.

The hand grip 15b has a longitudinally extending slot 15c adjacent one end thereof and over which end the locking bar 21 may be moved. Locking bar 21 is flat and has a rectangular section. At one end thereof locking bar 21 is rolled over upon itself as represented at 21a to form a sleeve through which pin 22 carried by the bifurcated end of bracket 23 extends. Thus, bar 21 is journalled in the end of bracket 23 and may be moved from the depending or hanging position to the upwardly extending vertically disposed position illustrated in Figs. 1, 2, 6, 7, and 10. The bracket 23 is provided with a pair of resilient arms 24 through which clamping bolt 25 extends for clamping the bracket immediately below the latching cap 20. The locking bar 21 is apertured at 21b and 21c and when swung to the upwardly extending vertical position illustrated in Figs. 1, 2, 6, 7 and 10, as distinguished from downwardly depending position, either aperture 21b or 21c may be engaged over the projecting end 15b of the manually controllable handle of the valve actuating rod 15.

In the position shown in Fig. 1, the manually operable handle 15b is engaged through aperture 21b in locking bar 21 by which the ball valve 16 is locked in closed position against annular seat 17. In this position the band-like seal 26 is passed through the slot 15c in handle 15b and is lug-welded as represented at 27, thus preventing unauthorized removal of locking bar 21 from the end of handle 15b. Valve 16 may also be locked in open position to prevent liquid accumulated from melting ice in the car refrigeration chambers which could freeze and plug the drain piping in winter and for this purpose valve actuating rod 15 is moved vertically so that the end of the hand-grip 15b projects through aperture 21c in bar 21 whereupon band 26 is inserted through slot 15c and the ends of the band lug-sealed as represented at 27. Only by breaking the seals or melting the lug seal is it possible to remove bar 21 from the ends of the manually gripped bar 15b. Thus, the valve actuating rod 15 is locked in set position against all practical displacement except by authorized persons charged with the conditioning of the refrigeration car at the commencement and end of each trip.

I have found the locking seal of my invention highly practical in the prevention of spoilage of shipments in refrigeration cars, but I realize, however, that my invention has numerous other applications, and I desire that it be understood that my disclosure herein shall be considered in the illustrative sense and that no limitations upon my invention are intended other than may be imposed by the scope of the appended claim.

What I claim as new and desire to secure by Letters Patent of the United States is as follows:

Locking means for rod members comprising in combination with a rod housing, a rod member slidably retractable into and projectable from said housing in a linear direction, said rod member terminating in a handle extending transversely with respect to said rod member and projecting beyond the limits of said housing, a bracket attached to said housing and having a yoke extending therefrom, a flat leaf member swingably mounted in said yoke and movable from a pendant position adjacent said housing to a position extending substantially parallel to one side of said housing and beyond the end thereof, said flat leaf member being apertured in spaced positions for receiving the protruding end of said transversely extending linear handle member in selected positions determined by the spacing of the apertures in said flat leaf member and means extending through the protruding end of said linear handle member on the side of said flat leaf member remote from said housing for maintaining said hinged leaf member in engaged position with respect to said linear handle.

HARRY K. BLANNING.

References Cited in the file of this patent

UNITED STATES PATENTS

| Number | Name | Date |
|---|---|---|
| 566,932 | Patrick | Sept. 1, 1896 |
| 598,211 | Toback | Feb. 1, 1896 |
| 1,363,225 | Boggs | Dec. 28, 1920 |
| 1,636,427 | Morrison | July 19, 1927 |
| 1,651,874 | Drews | Dec. 6, 1927 |

FOREIGN PATENTS

| Number | Country | Date |
|---|---|---|
| 188,034 | Great Britain | Oct. 26, 1922 |